Figure 1:
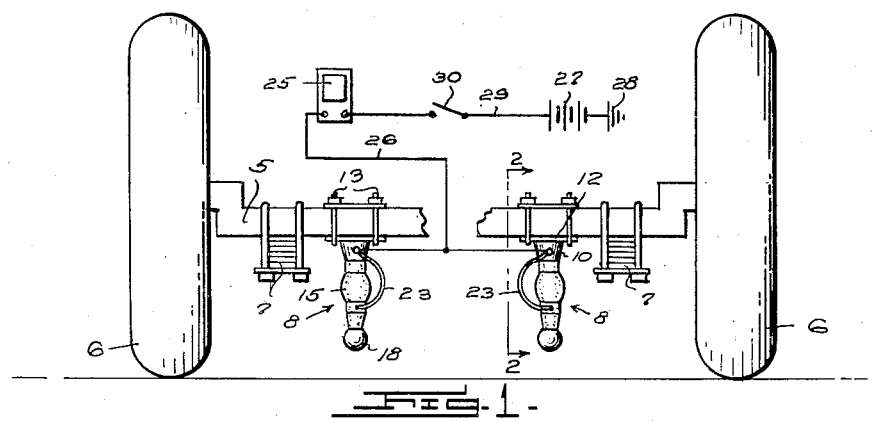

Nov. 2, 1948.  E. H. KUSTER  2,452,768

TIRE DEFLATION OPERATED SWITCH

Filed April 26, 1946

INVENTOR.
Edward H. Kuster,
BY
ATTORNEY

Patented Nov. 2, 1948

2,452,768

UNITED STATES PATENT OFFICE 2,452,768

TIRE DEFLATION OPERATED SWITCH

Edward H. Kuster, Del Ray Beach, Fla.

Application April 26, 1946, Serial No. 665,121

1 Claim. (Cl. 200—58)

My invention relates to an improved alarm or indicating device for motor vehicles, trailers or the like and has particular reference broadly to means for indicating to the driver the inflated condition of his tires.

Another object of the invention is the provision of such an indicating means that will render a visual or audible signal to the driver of a vehicle towed trailer or the like, where one or more wheels of such trailer have passed from the surfaced highway and are travelling on a lower level or rough surface likely to injure the tires or possible wrecking of the trailer should such tires engage in mud, sand or the like.

A further important object of the invention resides in the provision of an indicating device adapted to be mounted in a depending position adjacent each wheel of the vehicle or trailer, to be actuated when the normal position of the axle is lowered with respect to the surfaced highway, to cause an alarm to be sounded, indicating that the tire is becoming deflated or that the wheel is travelling on a lower or abnormal level.

Another object is the extreme simplicity of the device, its structural arrangement being such as to avoid damage when suddenly brought into engagement with a road surface, as by the lowering of the axle when a wheel drops from the edge of the road to a lower level, will at all times render a signal to the driver of such condition and will automatically assume its normal inoperative position upon disengagement with the road or other obstacle.

Other and important objects and advantages of the invention will present themselves during the course of the following description, reference being had to the accompanying drawing.

Figures 2, 3, 4, 5:
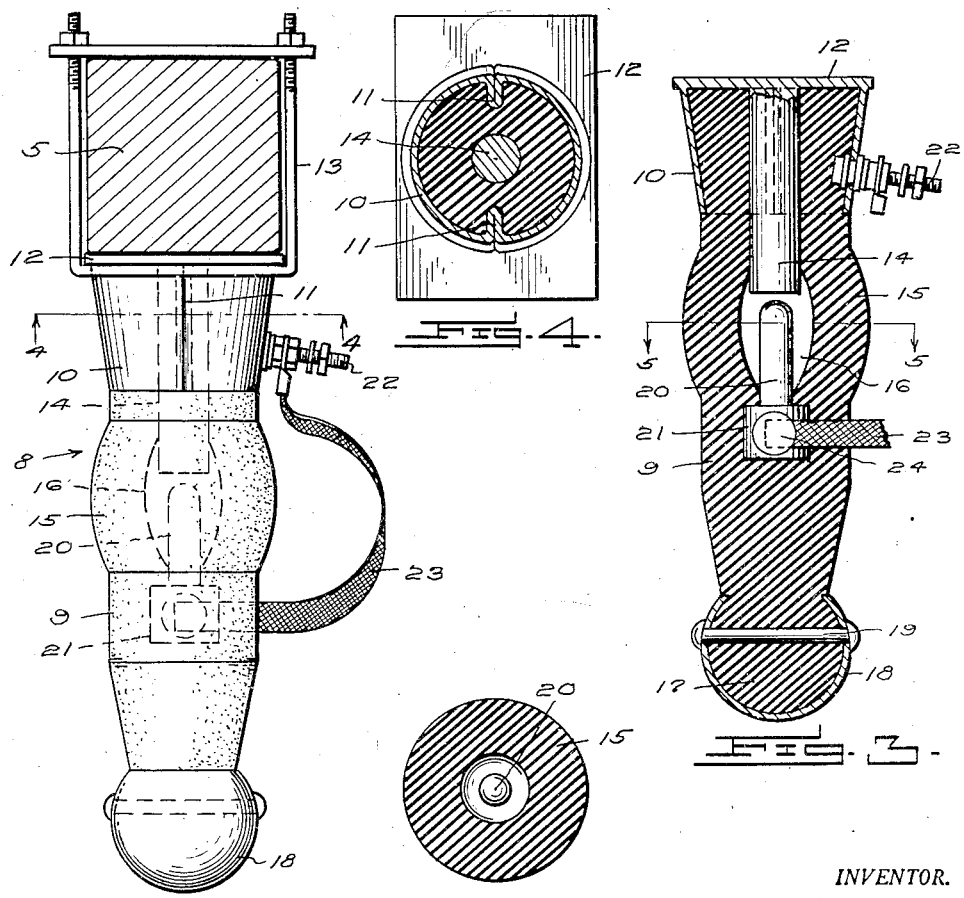

In the drawings,

Figure 1 is a view of a trailer axle and a pair of wheels, showing the invention in use, Figure 2 is a sectional view taken on line 2—2 of Figure 1, showing the device in side elevation, Figure 3 is a vertical section through the device, taken in the same plane as Figure 2, Figure 4 is a transverse section, taken on line 4—4 of Figure 2 and, Figure 5 is a transverse section taken on line 5—5 of Figure 3.

Referring specifically to the drawings, wherein like reference characters refer to like parts throughout, the numeral 5 designates a conventional trailer axle, carrying ground wheels 6 and supported in the usual manner by springs 7.

The numeral 8 indicates the invention as a whole, two being shown, but it will be understood that one of such devices will be employed for each wheel of the trailer. The invention has been illustrated as applied to the axle of a trailer, although it is obvious that it may be employed with equal success to automobiles, trucks or the like. Since the devices are identical, a description on one will suffice for both.

The device comprises an elongated body portion 9, formed of rubber or other suitable resilient material. The body 9 is rigidly supported at its upper end by a conical metallic ferrule 10, preferably stamped or pressed from material having a high rust resisting quality. The ferrule 10 is formed with inwardly pressed ribs 11, as clearly shown in Figure 4, extending throughout its length and diametrically oppositely disposed. The ferrule 10 is welded or otherwise permanently attached to a rectangular shaped metallic mounting plate 12, in turn supported against the bottom of the axle, as by U-bolts 13. The plate 12 has welded or otherwise attached thereto, a depending cylindrical contact element 14, of a length greater than the ferrule and centrally arranged with respect thereto. The contact 14 is axially disposed with respect to the body 9.

The body 9, approximately intermediate its ends, is formed substantially spherical or bulb shaped, as at 15, with a centrally arranged elliptical cavity 16, as clearly shown in Figure 3. The lower portion of the body 9 tapers to an enlarged spherical head 17, incased in a metallic spherical covering 18, held against turning or displacement by a rivet 19. Molded in the body 9 below the cavity 16, is a second contact element 20, cylindrical in shape and having an integral enlarged cylindrical head 21. The free end of the element 20 is arranged in slightly spaced axial alignment with the contact element 14 and both elements 14 and 20 terminate in the cavity 16. The free end of the contact 20 is rounded as indicated, for a purpose to be described.

The ferrule 10 is provided with a binding post 22, suitably insulated therefrom and this binding post has connection with the head 21 through the medium of a flexible braided electrical conductor 23, soldered or otherwise connected to the head 21, as at 24.

As shown in Figure 1, the binding post 22 of the several units have a common connection with an audible signal device 25, through the medium of a conductor wire 26. A battery, indicated at 27, is grounded at 28 and a conductor wire 29 leads from the opposite side of the battery to the signal device 25, having a switch 30 located in its length, such switch preferably being the ignition switch of the towing vehicle.

In contruction, the body portion 9 is preferably molded into and around the several elements of the unit, thereby obtaining a positive bonding of the rubber with the metal ferrule 10, spherical head 18 and contact elements 14 and 20. The arrangement of the ferrule with its ribs 11 assure a rigid support for the body portion against displacement and turning. Thus the body 9 may be flexed in any direction when brought into engagement with foreign elements without damage to the unit. The bulb portion 15 permits ready flexing in any direction, or a straight vertical movement to point of contact, without damage to the unit, since the rounded head of the element 20 when forced against the contact 14, slides thereon and assumes an angular position. It should be pointed out, that while the ferrule 10, plate 12 and contact 14 are shown and described as a fabricated unit, it is obvious that these several elements may be formed as a single unit casting, being a question of mechanical choice.

In use, the elements are rigidly mounted in a vertical depending position adjacent each wheel of the trailer and slightly inwardly of the suspending springs 7, as indicated, by the U-bolts 13. Conductor wires leading from the signal device 25 are connected with the several binding posts 22. The lower ends of the units are spaced from the roadway a predetermined distance, upon proper inflation of the tires. The length of the units would of course be determined for the particular trailer and size of tires employed and the point of underinflation falling within the range of safety required to actuate the unit. When the vehicle is standing and a leakage occurs in a tire, causing a lowering of the axle, the head 18 engages the road surface, forcing the body 9 upward by the flexing of the bulb 15, bringing the contact 20 into engagement with the contact 14, setting up a ground connection to the signal device 25 through the body of the vehicle. Continued downward movement of the axle causes the rounded head of the contact 20 to slip sideways, avoiding damage to the unit by too great a pressure thereon. As the contact 20 slips sideways, the movement is transmitted to the lower portion of the body 9 and through the use of the spherical head 18, the entire lower end will slip sideways, permitting a continued downward movement of the axle without injury to the unit. Throughout the pressure period upon the unit, regardless of the angularity, the contacts 14 and 20 will remain in electrical contact until the pressure is removed when it will be immediately assume its normal inoperative position.

When partial deflation occurs during the travel of the vehicle, the head 18 of the unit will engage the roadway in a sliding manner for distorting the unit and setting up a contact between the elements 14 and 20. The same action occurs when a wheel of the vehicle drops from the surfaced road to a lower level, warning the driver of the towing vehicle that an abnormal condition exists.

It will be seen from the foregoing that a means has been provided to render either a visual or audible signal to the driver that a dangerous condition exists with respect to the tires on his ground wheels, thus warning him in time to remove such dangerous condition before irreparable damage has been done to the tires or possibly to the vehicle itself. The structure has few and simple parts, is strong, durable and highly efficient is use.

It is to be understood, that the invention is not limited to the precise construction shown, but that it includes within its purview, whatever changes fairly come within either the terms or the scope of the appended claim.

Having described my invention, what I claim is:

A tire deflation signal device comprising an elongated cylindrical body portion of molded rubber having a spherical lower end, a metallic spherical wear resisting cover for the spherical end, a retaining pin passing through the cover and the spherical end, a metallic conical ferrule having inwardly pressed ribs and laterally extending oppositely directed attaching plates, said ferrule having the upper end of the body portion molded therein and around the said ribs, said body portion provided with a spherical bulb-like enlarged portion intermediate its ends, said bulb-like portion provided with a substantially concentric cavity therein, a centrally disposed contact element formed on the ferrule and extending through the body portion axially thereof and terminating in the said cavity, a centrally disposed contact element molded into the body portion and projecting upwardly in axial alignment with the first named contact and terminating in the said cavity in slightly spaced relation to the first named contact, the free end of the second named contact being rounded, a binding post carried by the ferrule and extending outwardly therefrom, a flexible braided electrical conductor soldered to the base of the second named contact and extending outwardly of the body portion for connection with the binding post, said binding post insulated from the said ferrule and U-shaped clamps for supporting the device upon the axle of a ground vehicle in proximity to its wheels.

EDWARD H. KUSTER.

REFERENCES CITED

The following references are of record in the file of this patent:

UNITED STATES PATENTS

| Number | Name | Date |
|---|---|---|
| 1,638,983 | Crone | Aug. 16, 1927 |
| 1,862,242 | Schwein | June 7, 1932 |
| 2,258,334 | Miller | Oct. 7, 1941 |